United States Patent [19]

Yasuda et al.

[11] Patent Number: 4,715,329
[45] Date of Patent: Dec. 29, 1987

[54] INDUCTION SYSTEM FOR INTERNAL COMBUSTION ENGINE

[75] Inventors: Makoto Yasuda; Shuichi Nishimura, both of Yokohama; Syouzabu Ura, Fujisawa, all of Japan

[73] Assignee: Nissan Motor Co., Ltd., Yokohama, Japan

[21] Appl. No.: 849,401

[22] Filed: Apr. 8, 1986

[30] Foreign Application Priority Data

Apr. 9, 1985 [JP] Japan .............................. 60-51649[U]

[51] Int. Cl.⁴ .............................................. F02B 75/18
[52] U.S. Cl. ................................ 123/52 MV; 123/572
[58] Field of Search ........ 123/52 M, 52 ML, 52 MV, 123/52 MB, 52 MC, 568, 572

[56] References Cited

U.S. PATENT DOCUMENTS

| | | | |
|---|---|---|---|
| 3,500,806 | 3/1970 | Sarto et al. ........................... | 123/572 |
| 3,730,160 | 5/1973 | Hughes ................................. | 123/572 |
| 3,990,419 | 11/1976 | Itakura ................................. | 123/572 |
| 4,195,607 | 4/1980 | Nagasaka et al. ..................... | 123/572 |
| 4,545,331 | 10/1985 | Ito et al. ............................. | 123/52 M |

FOREIGN PATENT DOCUMENTS 56-163745 12/1981 Japan .
57-196210 12/1982 Japan .

Primary Examiner—Craig R. Feinberg
Assistant Examiner—David A. Okonsky
Attorney, Agent, or Firm—Schwartz, Jeffery, Schwaab, Mack, Blumenthal & Evans

[57] ABSTRACT

In an induction system for an internal combustion engine having two groups of cylinders of which firing orders are respectively discontinuous, a groove is formed in a joining end face of a collector unit to be joined with a joining end face of an intake manifold in such a manner as to have a straight main groove section disposed between first and second groups of outlet ports so as to be equidistant from the outlet ports and a plurality of outlet groove sections branching off from the main groove section to fluidly connect the main groove section to each outlet ports. When the joining end faces of the collector unit and the intake manifold are joined together, a fluid recirculation passage such as a blow-by gas recirculation passage, an exhaust gas recirculation passage or the like is defined therebetween.

5 Claims, 4 Drawing Figures

INDUCTION SYSTEM FOR INTERNAL COMBUSTION ENGINE

BACKGROUND OF THE INVENTION

1. Field of the Invention

The present invention relates to an induction system for an internal combustion engine, particularly of the kind having a fluid recirculation passage such as a blow-by gas recirculation passage, exhaust gas recirculation passage or the like.

2. Description of the Prior Art

An example of a prior art induction system having a blow-by gas recirculation passage is shown in FIGS. 3 and 4.

Referring to the figures, indicated by the reference numeral 1 is an intake manifold consisting of a collector portion 2 consecutive with a throttle chamber 8 and a branch passage portion 3 consecutive with the downstream end of the collector portion 2 for supplying air to intake ports in a cylinder head 9. The collector portion 2 is formed with a blow-by gas passage 4 integral with the inner wall 2a thereof and having an open end adjacent the throttle chamber 8 so that blow-by gases are mixed with air uniformly. Indicated by the reference numeral 6 is a hose for introducing blow-by gases to the blow-by gas passage 4.

A disadvantage of the prior art induction system is that such a blow-by gas passage is difficult in manufacture and costly. This is particularly true when the blow-by gas passage is so shaped as to have a plurality of outlets for uniformly distributing blow-by gases to each branch passages 3a–3f of the branch passage portion 3 whether it is produced by casting or machining.

SUMMARY OF THE INVENTION

In accordance with the present invention, there is provided a novel and improved induction system for an internal combustion engine. The induction system comprises an intake manifold having a plurality of passages supplying air to the cylinders and a planar joining end face, a collector unit for supplying air to the passages of the intake manifold and having a joining end face at which it is joined with the intake manifold, and a groove formed in at least one of the joining end faces to define therebetween a fluid recirculation passage and having a main groove section and a plurality of outlet groove sections branching off from the main groove section so that recirculation fluid is drawn in the main groove section and distributed from the outlet groove sections to the passages of the intake manifold, respectively.

The above structure is quite effective for overcoming the above noted disadvantages and shortcomings inherent in the prior art system.

It is accordingly an object of the present invention to provide a novel and improved induction system for an internal combustion engine of which fluid recirculation passage is easy in manufacture and cheap.

It is another object of the present invention to provide a novel and improved induction system of the above described character which can distribute recirculation fluid such as blow-by gases or exhaust gases to each engine cylinders with an increased uniformity.

It is a further object of the present invention to provide a novel and improved induction system of the above described character which can reduce the design restrictions on the fluid recirculation passage and assuredly prevent clogging of same.

It is a still further object of the present invention to provide a novel and improved induction system of the above described character of which fluid recirculation passage is easy in maintenance.

BRIEF DESCRIPTION OF THE DRAWINGS

The features and advantages of the induction system of the present invention will become more clearly appreciated from the following description taken in conjunction with the accompanying drawings, in which.

DETAILED DESCRIPTION OF THE PREFERRED EMBODIMENT

Figure 1:
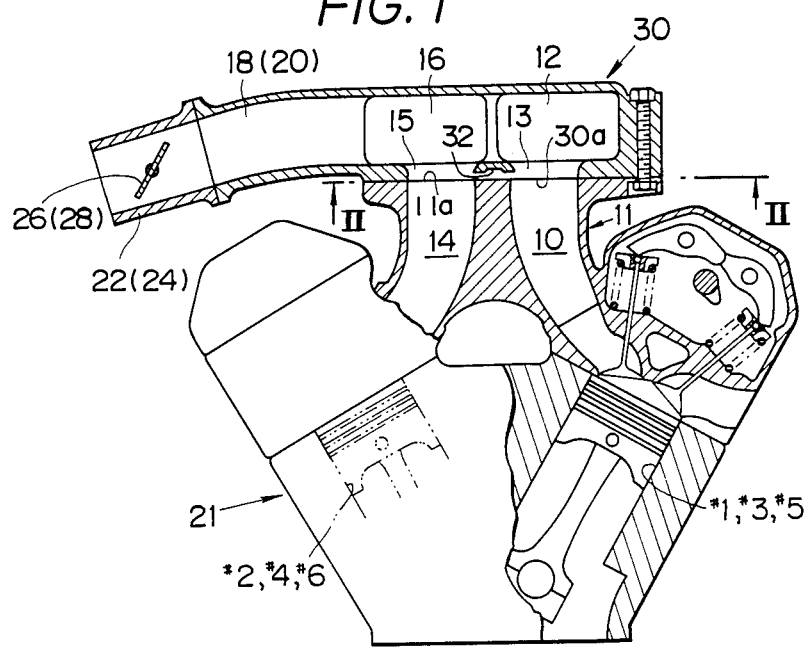
FIG. 1 is a sectional elevational view of an induction system of the present invention together with a Vee-six internal combustion engine.
Figure 2:
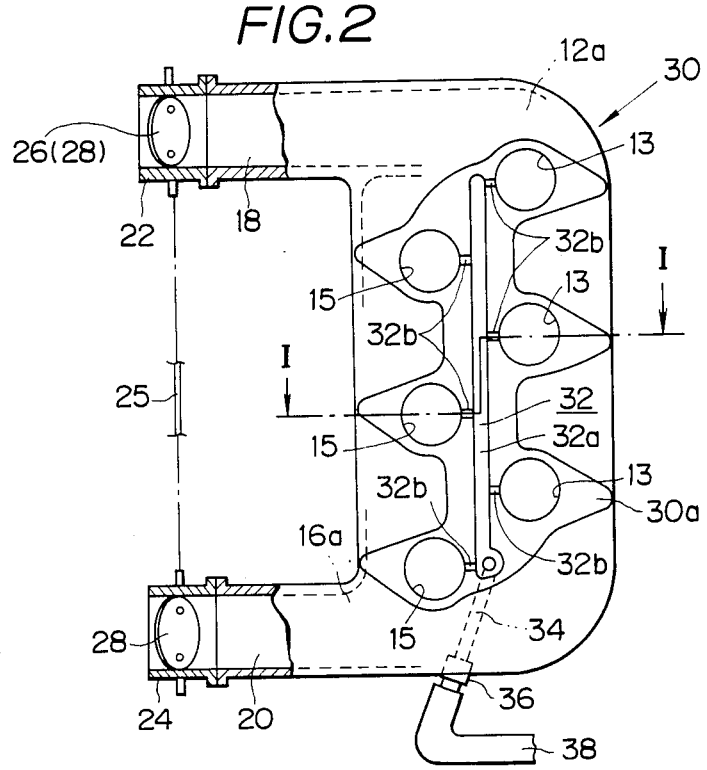
FIG. 2 is a sectional view taken along the line II—II of FIG. 1.
Figure 3:
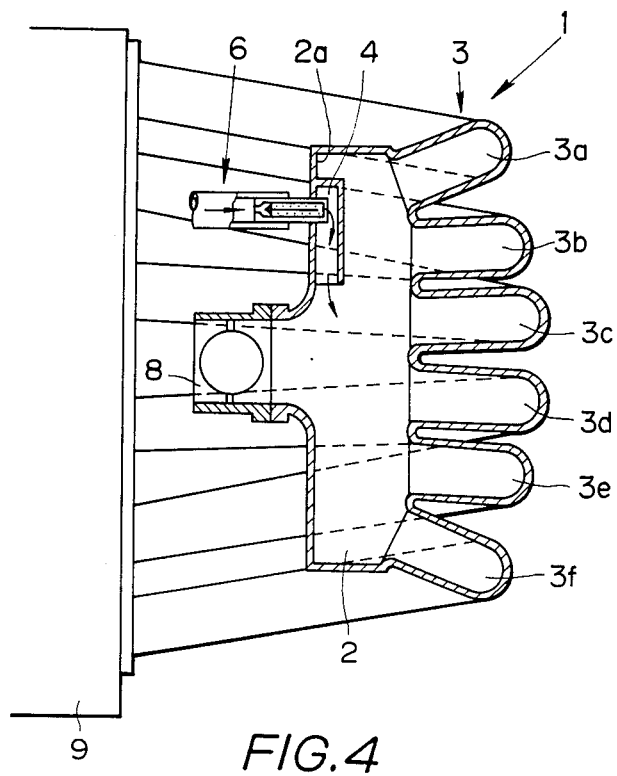
FIGS. 3 and 4 are sectional views of a prior art induction system.
Figure 4:
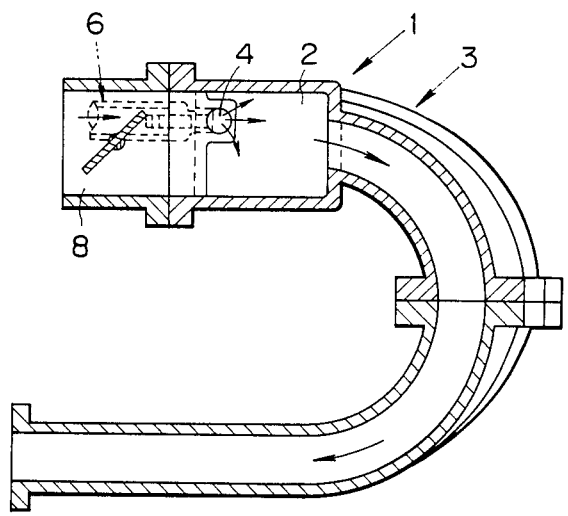

Referring to FIGS. 1 and 2, an internal combustion engine 21 is shown as of a Vee-six type and having a first group of cylinders #1, #3, #5 shown in the right-hand part of FIG. 1 and a second group of cylinders #2, #4, #6 shown in the left-hand part of the same figure. The cylinders are so grouped as to be respectively discontinuous in firing order.

The first group of cylinders #1, #3, #5 are fluidly connected via passages 10 of an intake manifold 11 to a first collector 12, while the second group of cylinders #2, #4, #6 are fluidly connected via passages 14 of the intake manifold 11 to a second collector 16.

The first and second collectors 12, 16 are elongated in parallel to each other and fluidly separated. The first collector 12 has outlet ports 13 through which it is fluidly connected to the passages 10 while the second collector 16 has outlet ports 15 through which it is fluidly connected to the passages 14.

The first collector 12 is fluidly connected at the open end 12a thereof to a first main air supply passage 18, while the second collector 16 is fluidly connected at the open end 16a thereof to a second main air supply passage 20, so that two independent air supply lines are formed. The first and second main air supply passages 18, 20 are elongated in parallel to each other in the direction intersecting the axes of the collectors 12, 16 at right angles. The first and second main air supply passages 18, 20 are fluidly connected at the upstream ends thereof to induction passages 22, 24 which are in turn connected, though not shown, to a common air surge tank which is in turn connected through an airflow meter to an air cleaner. Within the first and second induction passages 22, 24 there are respectively disposed first and second throttle valves 26, 28 which are interconnected by a shaft 25 for synchronously controlling airflow therethrough.

The first and second collectors 12, 16, outlet ports 13, 15 and the first and second main air supply passages 18, 20 are formed in a one-piece collector unit 30. The collector unit 30 has a planar joining end face 30a at which it is fittingly joined with a correspondingly planar joining end face 11a of the manifold 11.

The collector unit 30 is formed at the joining face 30a thereof with a groove 32 consisting of a straight main groove section 32a disposed between the row of outlet ports 13 and the row of outlet ports 15 so as to be equidistant from the outlet ports 13, 15 and a plurality of outlet groove sections 32b branching off from the main groove section 32a to fluidly connect the main groove section 32a to the respective outlet ports 13, 15 at the closest positions thereof. When the joining end faces 30a, 11a are joined together, the groove 32 forms a blow-by gas distribution passage therebetween.

The groove 32 is fluidly connected at an end to a blow-by gas induction passage 34. A pressure control valve 36 of the conventional type is disposed in the blow-by gas induction passage 34 for the well known purpose, i.e., for controlling the amount of blow-by gases supplied to the cylinders #1–#6 based on induction passage 34 is fluidly connected through a hose 38 to a crank case, etc. though not shown in the drawings.

With the above structure, blow-by gases are supplied from the blow-by gas induction passage 34 to the blow-by gas distribution passage formed by the groove 32 and distribute from the outlet groove sections 32b to each cylinders #1–#6 through the outlet ports 13, 15 and the passages 10, 14 of the intake manifold 11.

In the above, it is to be noted that the groove 32 is quite easy in manufacture whether it is produced by casting or machining.

It is further to be noted that the fluid recirculation passage formed by the groove 32 is so shaped as to directly supply blow-by gases to each outlet ports 13, 15, whereby it becomes possible to distribute blow-by gases to the cylinders #1–#6 with an increased uniformity.

It is still further to be noted that the groove 32 can be designed more freely than the passage 4 in the prior art system, whereby it becomes easier to set the sectional area of the groove 32 so as to prevent clogging of same.

It is yet further to be noted that the blow-by gas distribution passage formed by the groove 32 can be checked and cleaned with ease when the collector unit 30 is removed from the intake manifold 11, whereby maintenance thereof becomes easier.

While the present invention has been described and shown as to an induction system having a blow-by gas recirculation passage, this is not limitative. For example, the blow-by gas recirculation passage can be a different fluid recirculation passage such as an EGR (exhaust gas recirculation) passage.

What is claimed is:

1. An induction system for an internal combustion engine having a plurality of cylinders, comprising:
    an intake manifold having a plurality of passages for supplying air to the cylinders and an upstream planar joining end face;
    a collector unit located upstream of said intake manifold for supplying air to said passages of said intake manifold and having a planar joining end face which is joined with said planar joining end face of said intake manifold; and
    a groove formed in at least one of said joining end faces to define therebetween a fluid recirculation passage and having a main groove section and a plurality of outlet groove sections branching off from said main groove section so that recirculation fluid is drawn in said main groove section and distributed from said outlet groove sections to said passages of said intake manifold, respectively.

2. An induction system for an internal combustion engine having a plurality of cylinders, comprising:
    a intake manifold having a plurality of passages for supplying air to the cylinders and an upstream planar joining end face;
    a collector unit located upstream of said intake manifold for supplying air to said passages of said intake manifold and having a planar joining end face which is joined with said planar joining end face of said intake manifold; and
    a groove formed in at least one of said joining end faces to define therebetween a fluid recirculation passage and having a main groove section and a plurality of outlet groove sections branching off from said main groove section so that recirculation fluid is drawn in said main groove section and distributed from said outlet groove sections to said passages of said intake manifold, respectively, said cylinders including a first group of cylinders and a second group of cylinders of which firing orders are respectively discontinuous, and in which said collector unit comprises a first group of outlet ports opening through said joining end face of said collector unit, a second group of outlet ports opening through said joining end face of said collector unit, a first collector for supplying air through said first group of outlet ports to said first group of cylinders, and a second collector for supplying air through said second group of outlet ports to said second group of cylinders, said main groove section being straight and disposed between said first and second groups of outlet ports so as to be equidistant from same, said outlet groove sections fluidly connecting said main groove section to said outlet ports at the closest positions thereof.

3. An induction system as set forth in claim 2, in which said groove is formed in said joining end face of said collector unit only.

4. An induction system as set forth in claim 3, in which said first and second collectors are arranged in parallel to each other, said collector unit further comprising a first main air supply passage fluidly connected to said first collector to form a first air supply line and a second main air supply passage fluidly connected to said second collector to form a second air supply line independent from said first air supply line, said first and second main air supply passages being elongated in parallel to each other in the direction transversing said first and second collectors.

5. An induction system as set forth in claim 4, in which said first and second group of outlet ports are respectively arranged in row and in parallel to each other.